US011507009B2

(12) United States Patent
Ohtoshi

(10) Patent No.: US 11,507,009 B2
(45) Date of Patent: Nov. 22, 2022

(54) DOCUMENT FEEDER AND IMAGE FORMING APPARATUS

(71) Applicant: SHARP KABUSHIKI KAISHA, Sakai (JP)

(72) Inventor: Takenori Ohtoshi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/489,722

(22) Filed: Sep. 29, 2021

(65) Prior Publication Data

US 2022/0113666 A1 Apr. 14, 2022

(30) Foreign Application Priority Data

Oct. 8, 2020 (JP) .............................. JP2020-170738

(51) Int. Cl.
*G03G 15/00* (2006.01)
*H04N 1/00* (2006.01)

(52) U.S. Cl.
CPC ........... *G03G 15/60* (2013.01); *H04N 1/0057* (2013.01); *G03G 2215/00185* (2013.01)

(58) Field of Classification Search
CPC ......... H04N 2201/0081; H04N 1/0057; H04N 2201/0094; H04N 1/00588; H04N 1/00708; H04N 1/12; H04N 1/00623; H04N 1/00689; H04N 1/00774; H04N 1/00782; H04N 1/00814; H04N 1/00824; H04N 1/1061; H04N 1/32464; H04N 1/3263; H04N 2201/02497; H04N 1/00408; H04N 1/00795; H04N 2201/0091; H04N 2201/0422; H04N 2201/3226; H04N 1/00209; H04N 1/0032; H04N 1/00519; H04N 1/00554; H04N 1/0062; H04N 1/00628; H04N 1/00649; H04N 1/00663; H04N 1/00811; H04N 1/00827; H04N 1/00912; H04N 1/00976; H04N 1/10;
(Continued)

(56) References Cited

U.S. PATENT DOCUMENTS 9,197,780 B2 * 11/2015 Tokonami .......... H04N 1/00554
2014/0140746 A1 * 5/2014 Egawa ............... G03G 15/6576
399/406
(Continued)

FOREIGN PATENT DOCUMENTS

JP S61-140439 A 6/1986

*Primary Examiner* — Negussie Worku
(74) *Attorney, Agent, or Firm* — ScienBiziP, P.C.

(57) ABSTRACT

A cover that covers side surfaces of a document conveyance path and a paper feeder in a direction orthogonal to a document conveyance direction and a notifier that notifies information on a document placement section are included. The cover has a first side surface disposed along the document conveyance direction and a second side surface disposed from an end of the first side surface on the paper feeder side toward the document placement section. The notifier includes a displayer that displays the information by light. The displayer includes a first displayer disposed on the first side surface and a second displayer disposed on the second side surface toward the document placement section. The first displayer and the second displayer each have a horizontal length that is longer than a vertical length.

10 Claims, 7 Drawing Sheets

(58) Field of Classification Search
CPC .. H04N 1/193; H04N 1/2032; H04N 1/32138; H04N 1/32358; H04N 1/32609; H04N 1/32619; H04N 1/32662; H04N 1/32667; H04N 1/32673; H04N 1/3873; H04N 2201/0098; H04N 2201/0434; H04N 2201/3212; H04N 2201/3219; H04N 2201/3223; H04N 2201/3232; H04N 2201/3274; H04N 1/00037; H04N 1/00076; H04N 1/00204; H04N 1/00326; H04N 1/00334; H04N 1/00474; H04N 1/00525; H04N 1/00543; H04N 1/00551; H04N 1/00559; H04N 1/00567; H04N 1/00801; H04N 1/00864; H04N 1/0087; H04N 1/2338; H04N 1/32133; H04N 1/32149; H04N 1/4486; H04N 2201/3225; H04N 2201/3242; G03G 15/605; G03G 15/00; G03G 15/60; G03G 15/602; G03G 15/607; G03G 15/6508; G03G 15/6552; G03G 2215/00189; G03G 2215/00185; G03G 15/6561; G03G 2215/0035; G03G 2215/00548; G03G 15/23; B65H 2301/31124; B65H 5/06; B65H 7/125; B02C 18/0007; B02C 2018/0015; B02C 2018/0023; B02C 25/00; G06Q 50/01
USPC ........................................................ 358/498
See application file for complete search history.

(56) References Cited

U.S. PATENT DOCUMENTS

| | | | |
|---|---|---|---|
| 2014/0294478 A1* | 10/2014 | Osaki | G03G 15/6576 |
| | | | 399/406 |
| 2021/0218854 A1* | 7/2021 | Yoshiwara | H04N 1/00602 |
| 2021/0250460 A1* | 8/2021 | Mabara | H04N 1/00814 |
| 2021/0377416 A1* | 12/2021 | Sekigawa | H04N 1/00795 |
| 2021/0400154 A1* | 12/2021 | Ishida | H04N 1/00631 |

* cited by examiner

DOCUMENT FEEDER AND IMAGE FORMING APPARATUS

BACKGROUND OF THE INVENTION

Field of the Invention

The present invention relates to a document feeder and an image forming apparatus equipped with the document feeder.

Description of the Background Art

Conventionally, an image forming apparatus equipped with a document feeder (automatic document feeder (ADF)) is known. The document feeder is disposed above an operation section (operation panel) operated by an operator. A document placement section for placing a document is disposed at the rear of the operation panel when viewed from the operation panel side.

Therefore, the document placed on the document placement section is somewhat difficult for the operator to see. If the operator tilts the document feeder upward and opens it without noticing the document set or left on the document placement section, the document may fall from the document placement section.

Japanese Unexamined Patent Application Publication No. 61-140439 discloses a technique in which, in a state where a document is set on a glass document table of an image forming apparatus, when a document is set on a document placement section, a notification lamp disposed on an operation panel is lit.

However, the notification lamp disclosed in Japanese Unexamined Patent Application Publication No. 61-140439 is disposed on the operation panel and is positioned away from the document placement section. As a result, even when the notification lamp is lit, the operator may overlook the lighting of the notification lamp, or even when the operator notices the lighting of the notification lamp, it may be difficult to understand the intent of the information notified by the notification lamp.

An object of the present invention is to guide the operator's line of sight to the document placement section by the notifier, and is to make it easier for the operator to understand that the information notified by the notifier is information on the document placement section and the intent of the notified information.

SUMMARY OF THE INVENTION

A document feeder of the present invention includes a document placement section where a plurality of documents can be placed, a document conveyance path that conveys documents placed on the document placement section, a paper feeder that feeds the documents placed on the document placement section to the document conveyance path, a cover that covers side surfaces of the document conveyance path and the paper feeder in a direction orthogonal to a document conveyance direction, and a notifier that notifies information on the document placement section. The cover has a first side surface disposed along the document conveyance direction and a second side surface disposed from an end of the first side surface on the paper feeder side toward the document placement section.

The notifier includes a displayer that displays the information by light. The displayer includes a first displayer disposed on the first side surface and a second displayer disposed on the second side surface toward the document placement section. The first displayer and the second displayer each have a horizontal length that is longer than a vertical length.

According to the above configuration, a displayer that notifies information on a document placement section by light is provided on the first side surface and the second side surface of a cover that covers the side surfaces of a document conveyance path and a paper feeder in a direction perpendicular to a document conveyance direction. In addition, the first displayer disposed on the first side surface and the second displayer disposed on the second side surface toward the document placement section each have a horizontal length that is longer than a vertical length. As a result, the displayer of the notifier can guide the operator's line of sight to the document placement section. This can make it easier for the operator to understand that the information notified by the notifier is information on the document placement section and the intent of the notified information.

In the first configuration above, the first side surface and the second side surface are formed to be continuous, and the first displayer and the second displayer may be integrally formed (second configuration).

According to the above configuration, the first displayer and the second displayer constituting the displayer are integrally formed. This makes it easier to guide the operator's line of sight to the document placement section disposed at the end in the direction in which the displayer extends.

In the first configuration above, the first displayer and the second displayer may be individually disposed on the first side surface and the second side surface, respectively (third configuration).

According to the above configuration, the first displayer and the second displayer, which constitute the displayer, are individually disposed on the first side surface and the second side surface. As a result, the operator's line of sight can be easily guided to the document placement section that is disposed at the end in the direction in which the first displayer and the second displayer are lined up.

In any of the first to third configurations above, the second side surface may have a recess that emits light from the second displayer to a document placement section side in an area adjacent to the second displayer and closer to the document placement section than the second displayer (fourth configuration).

According to the above configuration, the second side surface of the cover has a recess that emits light from the second displayer to the document placement section side. The light from the displayer is emitted to the document placement section side, and thus the range in which the light can be seen can be widened, and the visibility of the notifier can be improved. In addition, the gradation of light and dark caused by light hitting the recess can improve the visibility of the notifier.

In any of the first to fourth configurations above, a top surface cover that covers a top surface side of the paper feeder and the document conveyance path may be further included, and the top surface cover may have a top surface cover end that constitutes an upper end of a document passing portion through which a document fed by the paper feeder passes, and the displayer may be substantially disposed on an extension line of the top surface cover end (fifth configuration).

According to the above configuration, the displayer is substantially disposed on an extension line of the top surface cover end. As a result, the operator's line of sight can be guided from the displayer to the document placement section along the top surface cover end. This can make it easy for the operator to understand that the information notified by the notifier is information on the document placement section.

In any of the first to fifth configurations above, the notifier may include a light source that emits light to the displayer, and the displayer may have translucency that allows light from the light source to pass through, and have a protrusion that protrudes outward from an outer surface of the cover (sixth configuration).

According to the above configuration, the displayer has translucency that allows light from the light source to pass through, and has a protrusion that protrudes outward from an outer surface of the cover. This makes it easy to see the light of the displayer not only from the side but also from above.

In the sixth configuration above, the displayer may have a minute unevenness that diffusely reflects light from the light source (seventh configuration).

According to the above configuration, the displayer has a minute unevenness that diffusely reflects light from the light source. As a result, light can be emitted from the entire displayer, and the visibility of the displayer can be improved.

In the sixth or seventh configuration above, the notifier may include a support case for attaching the light source and the displayer to the cover, and the support case may have a first opening to which the displayer is attached, and a wall that blocks light from the light source in such a manner that the light is not emitted from other than the first opening (eighth configuration).

According to the above configuration, the support case has a first opening to which the displayer is attached, and a wall that blocks light from the light source in such a manner that the light is not emitted from other than the first opening. As a result, it is possible to suppress light from the light source from leaking into the interior of the cover.

In the eighth configuration above, the support case may have a second opening to which the light source is attached, and the second opening may be provided at a position facing the first opening (ninth configuration).

According to the above configuration, the second opening to which the light source is attached is provided at a position facing the first opening to which the displayer is attached. As a result, the light source can be easily installed and replaced, and light from the light source can be prevented from leaking into the interior of the cover.

An image forming apparatus of the present invention includes the document feeder of any of the first to ninth configurations above (tenth configuration).

According to the above configuration, the displayer of the notifier can guide the operator's line of sight to the document placement section. This can make it easier for the operator to understand that the information notified by the notifier is information on the document placement section and the intent of the notified information.

According to the document feeder and the image forming apparatus of the present invention, the displayer of the notifier can guide the operator's line of sight to the document placement section. This can make it easier for the operator to understand that the information notified by the notifier is information on the document placement section and the intent of the notified information.

DESCRIPTION OF THE PREFERRED EMBODIMENTS

Embodiment 1

Figure 1:
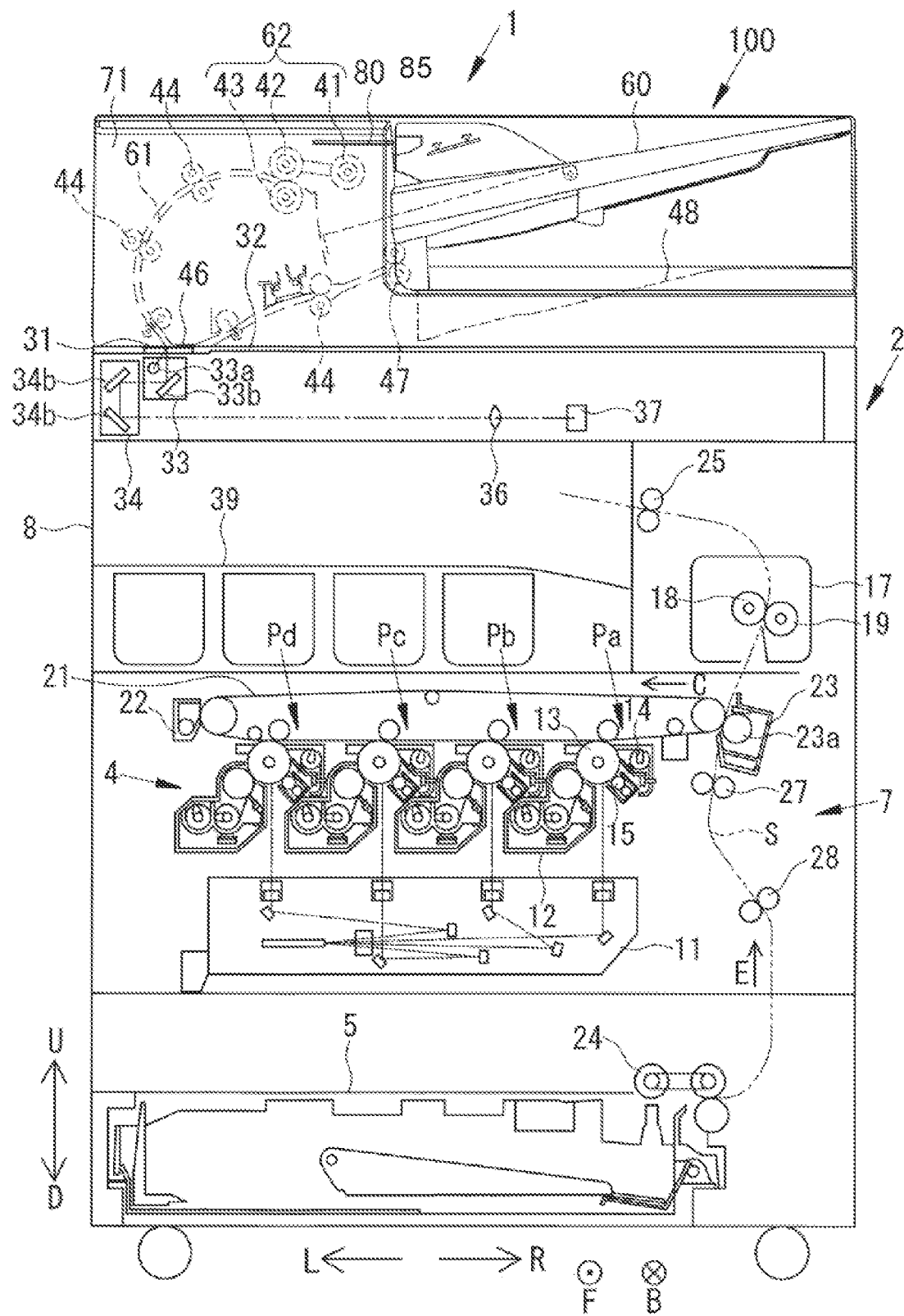
FIG. 1 is a cross-sectional view of an image forming apparatus to which a document feeder according to an embodiment is applied.

An embodiment of the present invention will now be described with reference to the accompanying drawings. FIG. 1 is a cross-sectional view of an image forming apparatus 1 to which a document feeder 100 according to an embodiment 1 is applied. The image forming apparatus 1 reads and prints color and monochrome images, and has a print function to print images on a recording paper, a scanner function to read images of a document, and a copy function to read images of a document and print images of the document on the recording paper.

In the following figures, an arrow F indicates the front surface side of the image forming apparatus 1, and an arrow B indicates the rear surface side. An arrow R indicates the rightward side of the image forming apparatus 1, and an arrow L indicates the leftward side of the image forming apparatus 1. An arrow U indicates the upward side of the image forming apparatus 1, and an arrow D indicates the downward side of the image forming apparatus 1.

The image forming apparatus 1 includes a document reader 2, a document feeder 100, a process unit 4, a paper feed cassette 5, and a paper conveyance device 7. The process unit 4, paper feed cassette 5, and paper conveyance device 7 are built into a main body 8 of the image forming apparatus 1. The document reader 2 and the document feeder 100 are mounted on the upper side of the main body 8 of the image forming apparatus 1. An operation panel 9 is provided at the end of the front side (standing side of a user) of the document reader 2 (see FIG. 2). The operation panel 9 is operated by the user to selectively operate the print, scanner, and copy functions, or the like of the image forming apparatus 1, and to select either a color image or a monochrome image.

A displayer 85 of a notifier 80 is disposed on a cover 71 of the document feeder 100. The notifier 80 notifies the user of information on a document placement section 60 by causing the displayer 85 to glow.

In the process unit 4, in order to print a color image using colors of black (K), cyan (C), magenta (M), and yellow (Y), or a monochrome image using monochrome (e.g., black) on a recording paper, four developing units 12, four photosensitive drums 13, four drum cleaning devices 14, and four charging rollers 15 are provided, which correspond to black, cyan, magenta, and yellow, respectively, and constitute four image stations Pa, Pb, Pc, and Pd. In addition, an optical scanning device 11 is provided below each of the image forming stations Pa, Pb, Pc and Pd.

In each of the image forming stations Pa, Pb, Pc and Pd, after removing and collecting residual toner on the surface of the photosensitive drum 13 by the drum cleaning device 14, the surface of the photosensitive drum 13 is uniformly charged to a predetermined potential by the charging roller 15, the surface of the photosensitive drum 13 is exposed by the optical scanning device 11 to form an electrostatic latent image on the surface of the photosensitive drum 13, the electrostatic latent image on the surface of the photosensitive drum 13 is developed by the developing unit 12, and a toner image is formed on the surface of the photosensitive drum 13. As a result, a toner image of each color is formed on the surface of each photosensitive drum 13.

Then, while the intermediate transfer belt 21 is moved circumferentially in an arrow direction C, the residual toner on the intermediate transfer belt 21 is removed and collected by a belt cleaning device 22, and then the toner images of each color on the surface of each photosensitive drum 13 are transferred to the intermediate transfer belt 21 one after another and superimposed to form a color toner image on the intermediate transfer belt 21.

A nip area is formed between the intermediate transfer belt 21 and a transfer roller 23a of a secondary transfer device 23, and while a recording paper conveyed through a paper conveyance path S is sandwiched and conveyed in the nip area, the color toner image on the surface of the intermediate transfer belt 21 is transferred onto the recording paper. Then, the recording paper is sandwiched between a heating roller 18 and a fixing roller 19 of a fixing device 17, and heated and pressurized to fix the color toner image on the recording paper.

In the paper conveyance device 7, the recording paper is pulled out of the paper feed cassette 5 by a pickup roller 24, conveyed through the paper conveyance path S, passed through the secondary transfer device 23 and the fixing device 17, and discharged into a paper discharge tray 39 via respective paper discharge rollers 25. Provided on the paper conveyance path S are respective resist rollers 27 that temporarily stop the recording paper and align the leading edge of the recording paper and restart conveyance of the recording paper in time with the transfer timing of the color toner image in the nip area between the intermediate transfer belt 21 and the transfer roller 23a, respective conveyance rollers 28 that facilitate conveyance of the recording paper, respective paper discharge rollers 25, and the like.

Next, a schematic configuration of the document reader 2 and the document feeder 100 mounted on the upper part of the main body 8 of the image forming apparatus 1 will be described. The document feeder 100 is axially supported on one side of the rear surface side by the document reader 2, and the front surface side of the document feeder 100 is opened and closed so as to be raised and lowered. When the document feeder 100 is opened, a document read glass 31 and a document placement glass 32 of the document reader 2 are opened, and a document can be placed on the document placement glass 32.

In the document reader 2, first and second scanners 33 and 34 are moved while maintaining a predetermined speed relation with each other, a light source 33a of the first scanner 33 illuminates the document on the document placement glass 32, respective mirrors 33b and 34b of the first and second scanners 33 and 34 guide the reflected light from the document to an imaging lens 36, and the imaging lens 36 forms an image of the document on a charge coupled device (CCD) 37. The CCD 37 repeatedly reads the image of the document in the main scanning direction and outputs image data indicating the image of the document.

The document reader 2 can read images of a document being conveyed by the document feeder 100 as well as a stationary document. In this case, the first scanner 33 is moved to a reading position below the document read glass 31, the second scanner 34 is positioned in accordance with the position of the first scanner 33, and in this state, conveyance of the document by the document feeder 100 is started.

The document feeder 100 feeds a plurality of documents placed on the document placement section 60 into a document conveyance path 61 one by one from the top by the pickup roller 41, a paper feed roller 42, and a separation roller 43 that constitute a paper feeder 62. (Since the separation roller 43 rotates in a direction opposite to the document conveyance direction, all but the topmost document is returned to the document placement section 60.) Then, the document fed into the document conveyance path 61 is conveyed by a document conveyance roller 44 provided in the document conveyance path 61 so as to pass between the document read glass 31 and an opposed guide plate 46 provided in the document conveyance path 61, and then discharged by a paper discharge roller 47 to a paper discharge tray 48.

Upon conveying the document, the light source 33a of the first scanner 33 illuminates the document through the document read glass 31, the reflected light from the document is reflected by the respective mirrors 33b and 34b of the first and second scanners 33 and 34 and is guided to the imaging lens 36. The imaging lens 36 images the image of the document on the CCD 37, and the CCD 37 reads the image of the document.

The image of the document read by the CCD 37 is output from the CCD 37 as an analog signal, and this analog signal is A/D converted to a digital signal. This digital signal (image data) is input to the optical scanning device 11 of the process unit 4 after being subjected to various image processing, and the image indicated by the image data is formed on the recording paper in the process unit 4.

Figure 2:
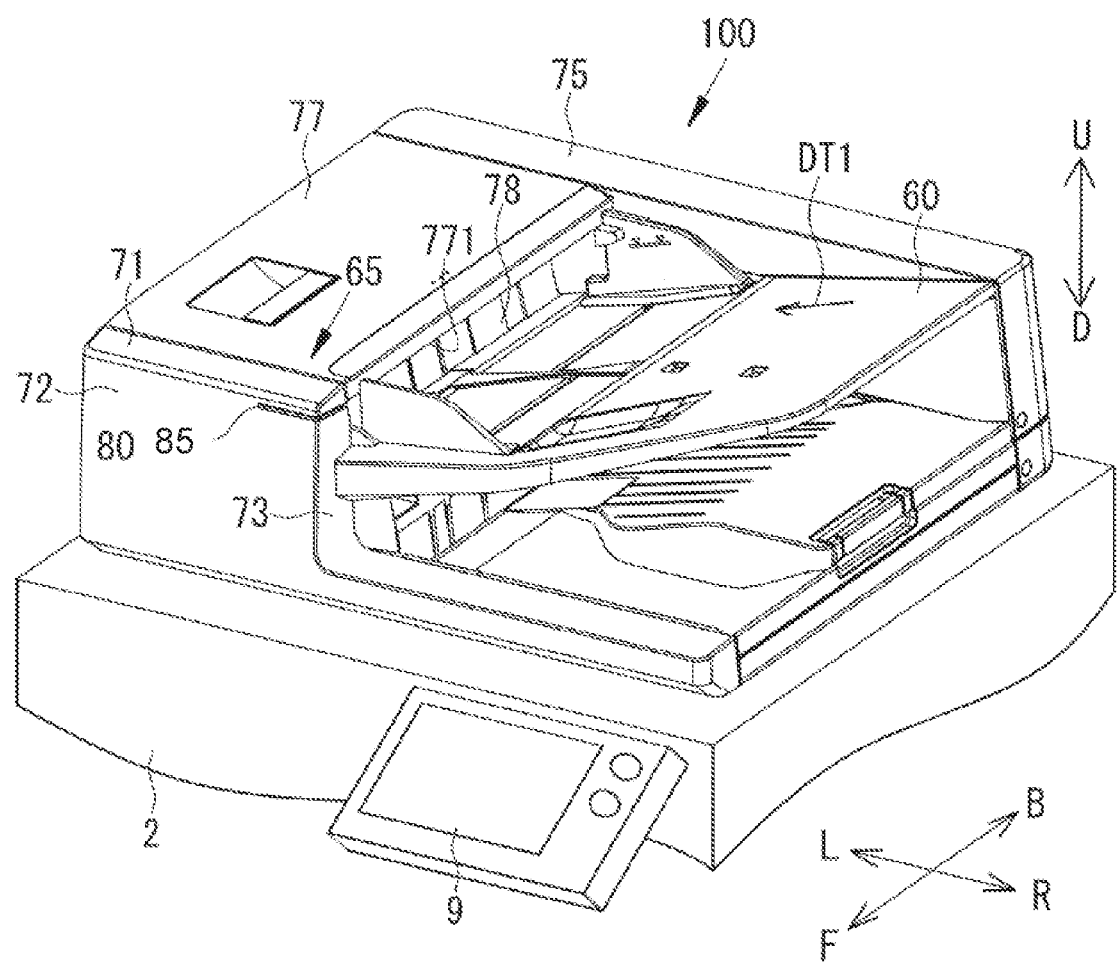
FIG. 2 is a perspective view of the document feeder.

Next, the document feeder 100 in this example will be described in detail. FIG. 2 is a perspective view of the document feeder 100. As illustrated in FIG. 2, the document feeder 100 includes the document placement section 60, document conveyance path 61 (see FIG. 1), paper feeder 62 (see FIG. 1), cover 71, a rear surface cover 75, a top surface cover 77, and the notifier 80.

The document placement section 60 is disposed above the operation panel 9 operated by the operator, and is disposed at the rear of the operation panel 9 when viewed from the operation panel 9 side. The document placement section 60 is configured to allow a plurality of documents to be placed. The document conveyance path 61 (see FIG. 1) is a path for conveying a document placed on the document placement section 60. The paper feeder 62 pulls out a document placed on the document placement section 60 by the pickup roller 41 (see FIG. 1) and feeds the document into the document conveyance path 61.

The direction in which the document placed on the document placement section 60 is fed by the paper feeder 62 into the document conveyance path 61 is defined as a document conveyance direction DT1. In this embodiment, the document conveyance direction DT1 is set to a direction from right to left. In other words, the document conveyance direction DT1 and the front-rear direction are orthogonal, and one of the horizontal directions orthogonal to the document conveyance direction DT1 is a front side F of the apparatus where the operation panel 9 is provided.

The cover 71 is disposed on the document feeder 100 on the front side F of the apparatus so as to cover one side surface in a direction orthogonal to the document conveyance direction DT1 of the document conveyance path 61 and the paper feeder 62. In other words, the cover 71 covers the front side F of the apparatus in the side portions of the paper feeder 62 and the document conveyance path 61.

The cover 71 has a first side surface 72 and a second side surface 73. The first side surface 72 is a surface that is disposed along the document conveyance direction and is formed toward the front side F of the apparatus. The second side surface 73 is a surface that is formed toward a right side R of the apparatus. In other words, the second side surface 73 is a surface disposed to face in the opposite direction to the document conveyance direction DT1. Further in other words, the second side surface 73 is a surface disposed in a direction intersecting the document conveyance direction from the end of the paper feeder 62 side of the first side surface 72 toward the document placement section 60. That is, the first side surface 72 and the second side surface 73 are adjacent surfaces that are disposed to be substantially orthogonal to each other. The first side surface 72 and the second side surface 73 are formed to be continuous through the corner portions.

The rear surface cover 75 is disposed on a rear side B of the document feeder 100. The rear surface cover 75 covers the rear side B of the apparatus in the side portions of the paper feeder 62 and the document conveyance path 61.

The top surface cover 77 is disposed on an upper surface side U of the document feeder 100. The top surface cover 77 covers the upper surface side U of the paper feeder 62 and the document conveyance path 61. The top surface cover 77 constitutes a document passage section 78 through which a document fed by the paper feeder 62 passes. The top surface cover 77 has a top surface cover end 771 constituting an upper end of the document passage section 78.

The notifier 80 notifies the user of information on the document placement section 60 by causing the displayer 85 to glow. The displayer 85 is provided at the upper part of the cover 71 and near the corner where the first side surface 72 and the second side surface 73 are continuous. The notifier 80 will be described in detail below.

Figure 3:
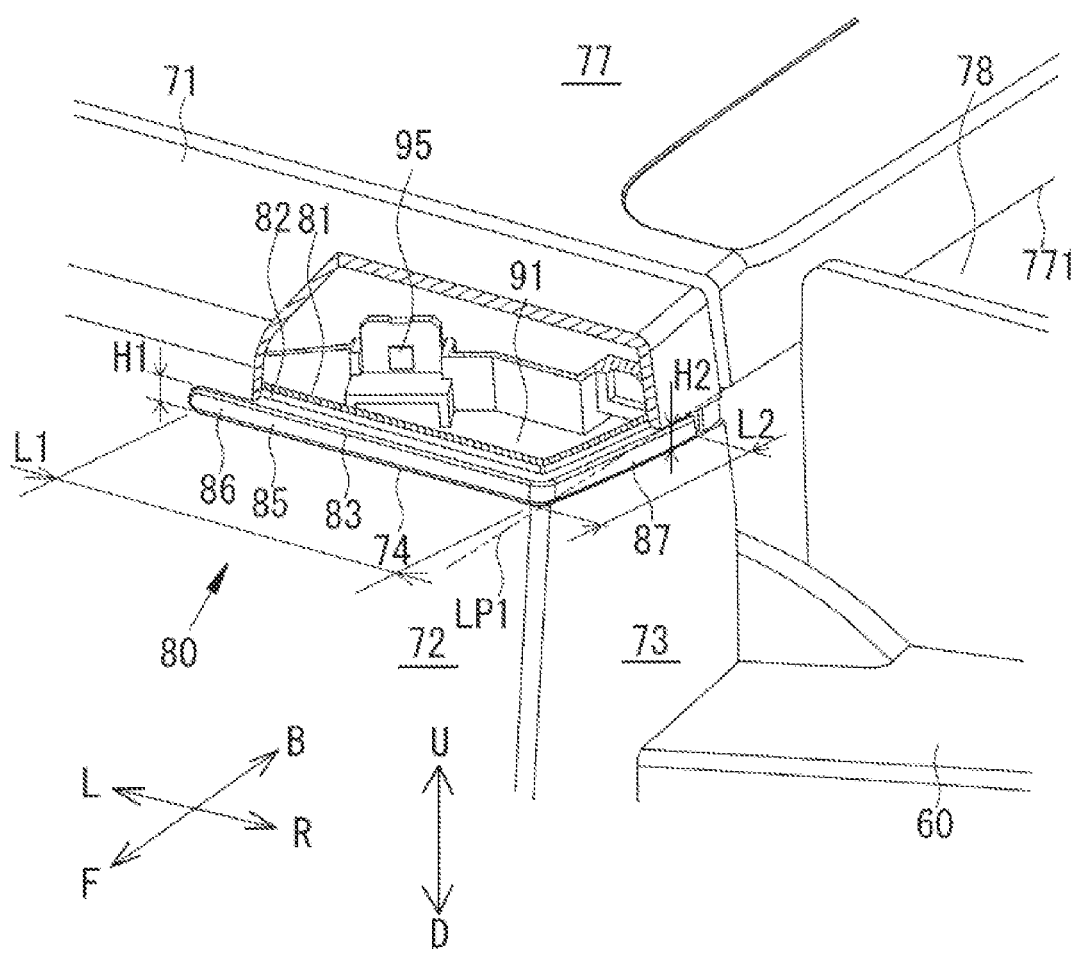
FIG. 3 is a perspective view of a part of a cover being cut off in the vicinity of a notifier.

FIG. 3 is a perspective view of a part of the cover 71 being cut off in the vicinity of the notifier 80. As illustrated in FIG. 3, the notifier 80 includes a light guide 81, a support case 91, and a light source 95.

The notifier 80 is configured, for example, to notify the user by light that a document has been placed on the document placement section 60 (or that a document remains). In this case, a sensor (not illustrated) that detects whether a document is placed on the document placement section 60 is disposed, for example, on the document placement section 60. When a controller (not illustrated) provided in the main body 8 of the image forming apparatus 1 detects, on the basis of the detection signal from the sensor, that a document is placed on the document placement section 60, the light source 95 of the notifier 80 is lit.

The information to be notified by the notifier 80 may be information other than the presence or absence of a document, as long as the information is related to the document placement section 60. In addition, the notification of information by light may be other than lighting on and off. For example, the notification may be by flashing or changing the light color.

The light guide 81 is a member that guides light from the light source 95 and emits the light to the outside. The light guide 81 is formed of a resin material having translucency. The light guide 81 includes a light guide base 82 and an elongated protrusion 83.

The light guide base 82 is a portion disposed on the inner surface side of the cover 71. The light guide base 82 is a thin plate-shaped member formed in an approximately L-shape in plan view along the inside near the corner of the cover 71.

The elongated protrusion 83 is a rib-like portion provided on the outside of the light guide base 82. The elongated protrusion 83 is formed in an approximately L-shape in plan view along the light guide base 82. The elongated protrusion 83 constitutes the displayer 85 of the notifier 80. The surface of the elongated protrusion 83 is formed with a minute unevenness in such a manner that light from the light source 95 can be diffusely reflected and the light can be emitted from the entire displayer 85. In this embodiment, an emboss finish that diffusely reflects the light is applied as the minute unevenness.

The cover 71 is formed with a slit 74 near the corner where the first side surface 72 and the second side surface 73 are continuous. The slit 74 is formed to extend horizontally on the first side surface 72 and the second side surface 73, respectively. The slit 74 is formed in such a manner that, with the light guide 81 disposed on the inner surface side of the cover 71, the elongated protrusion 83 of the light guide 81 is fitted and the elongated protrusion 83 is visible from the outside as the displayer 85.

The displayer 85 is a part that displays information on the document placement section 60 by light. The displayer 85 is constituted by the elongated protrusion 83 being exposed from the slit 74 of the cover 71. The displayer 85 includes a first displayer 86 and a second displayer 87.

The first displayer 86 is disposed on the first side surface 72 of the cover 71. The second displayer 87 is disposed on the second side second side surface 73 of the cover 71 so as to face the document placement section 60. In the present embodiment, the first displayer 86 and the second displayer 87 are respectively horizontally disposed and integrally formed. The first displayer 86 and the second displayer 87 are not limited to being horizontal, but may be disposed at an angle to the horizontal direction, respectively.

When the horizontal length of the first displayer 86 is set to be L1 and the vertical length of the first displayer 86 is set to be H1, the horizontal length L1 of the first displayer 86 is set to be larger than the vertical length H1.

In addition, when the horizontal length of the second displayer 87 is set to be L2 and the vertical length of the second displayer 87 is set to be 112, the horizontal length L2 of the second displayer 87 is set to be larger than the vertical length 112.

That is, the first displayer 86 and the second displayer 87 are set in such a manner that the horizontal lengths L1 and L2 are longer than the vertical lengths H1 and 112, respectively. By setting in this manner, the second displayer 87 is disposed on the second side surface 73 in an elongated manner toward the document placement section 60.

Furthermore, if an extension of the top surface cover end 771 is represented by a virtual line LP1 (see FIG. 3), the displayer 85 is substantially disposed on the extension line LP1 of the top surface cover end 771. The displayer 85 being disposed substantially on the extension line LP1 means that the second displayer 87 of the displayer 85 is disposed approximately parallel to the extension line LP1 and that the second displayer 87 is disposed in the vicinity of the extension line LP1. The vicinity is, for example, a state where the second displayer 87 touches an area whose vertical distance from the extension line LP1 is less than or equal to the vertical length H2 of the second displayer 87 in a state where the second displayer 87 is viewed from the right side to the left side. In addition, the second displayer 87 and the extension line LP1 may be disposed to overlap with each other when viewed from the right side to the left side.

Thus, since the second displayer 87 disposed on the second side surface 73 toward the document placement section 60 and the first displayer 86 disposed on the first side surface 72 are disposed adjacent to each other and in the vicinity of the extension line LP1, the operator's line of sight can be continuously guided to the document placement section 60 along the top surface cover end 771 disposed at the end where the displayer 85 extends. This can make it easier for the operator to understand that the information notified by the notifier 80 is information on the document placement section 60 and the intent of the notified information.

The support case 91 is a member for attaching the light guide 81 and the light source 95 on the inner surface side of the cover 71 and also for preventing the light of the light source 95 from leaking into the interior of the cover 71.

The light source 95 is a part that, when lit, emits light so as to emit light to the light guide 81. In the present embodiment, an LED (Light Emitting Diode) is used as the light source 95.

Figure 4:
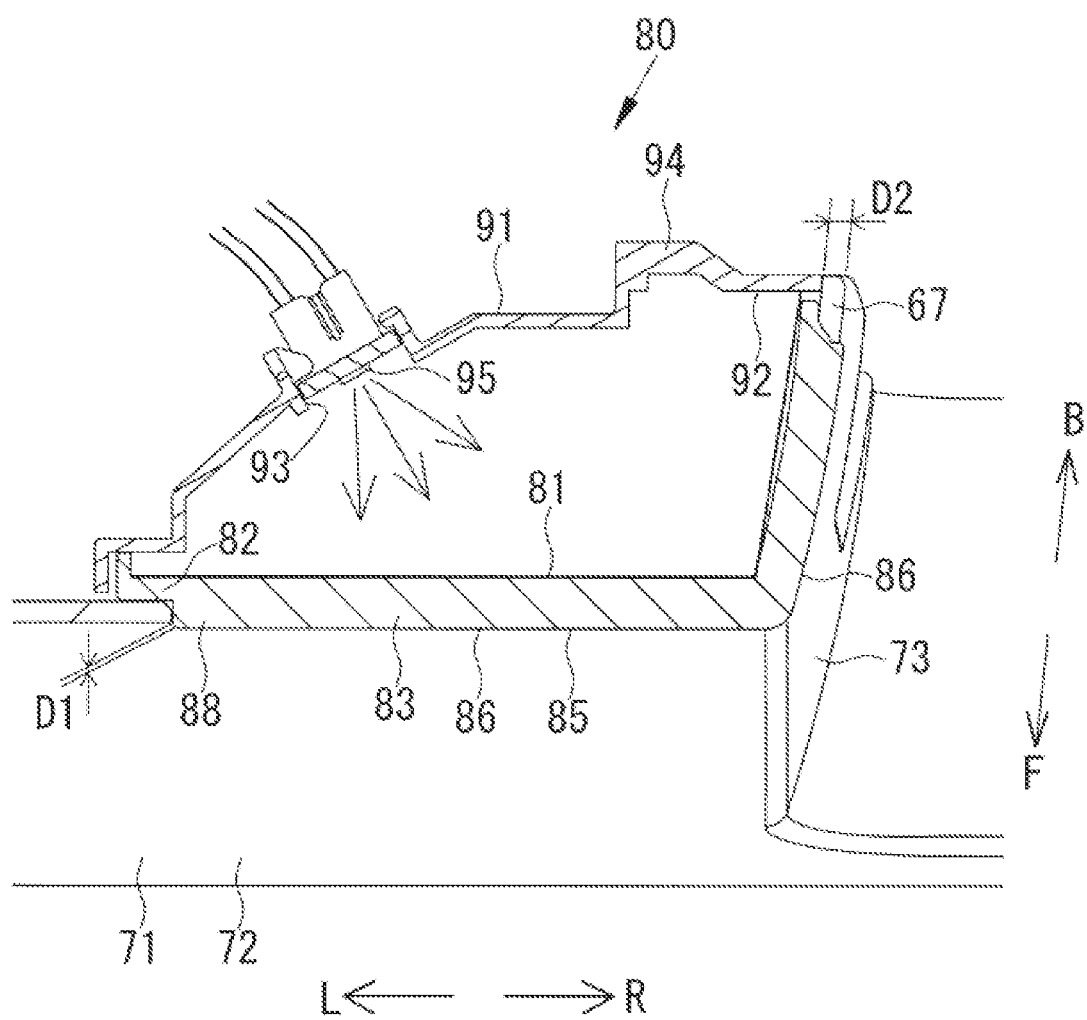
FIG. 4 is a cross-sectional view of a state where the displayer of the notifier is cut horizontally, seen from above.

FIG. 4 is a cross-sectional view of a state where the displayer 85 of the notifier 80 is cut horizontally, seen from above. As illustrated in FIG. 4, the elongated protrusion 83 of the light guide 81 is formed higher than the thickness of the plate of the cover 71. Therefore, the elongated protrusion 83 is disposed in such a manner that a part of the elongated protrusion 83 protrudes outward from the slit 74 of the cover 71. The portion protruding outwardly from the outer surface of the cover 71 is a protrusion 88 of the displayer 85. In this embodiment, the protruding amount of the protrusion 88 relative to the outer surface of the cover 71 is a height D1. The protrusion 88 makes it easy to see the light of the displayer 85 not only from the side but also from above.

Figure 5:
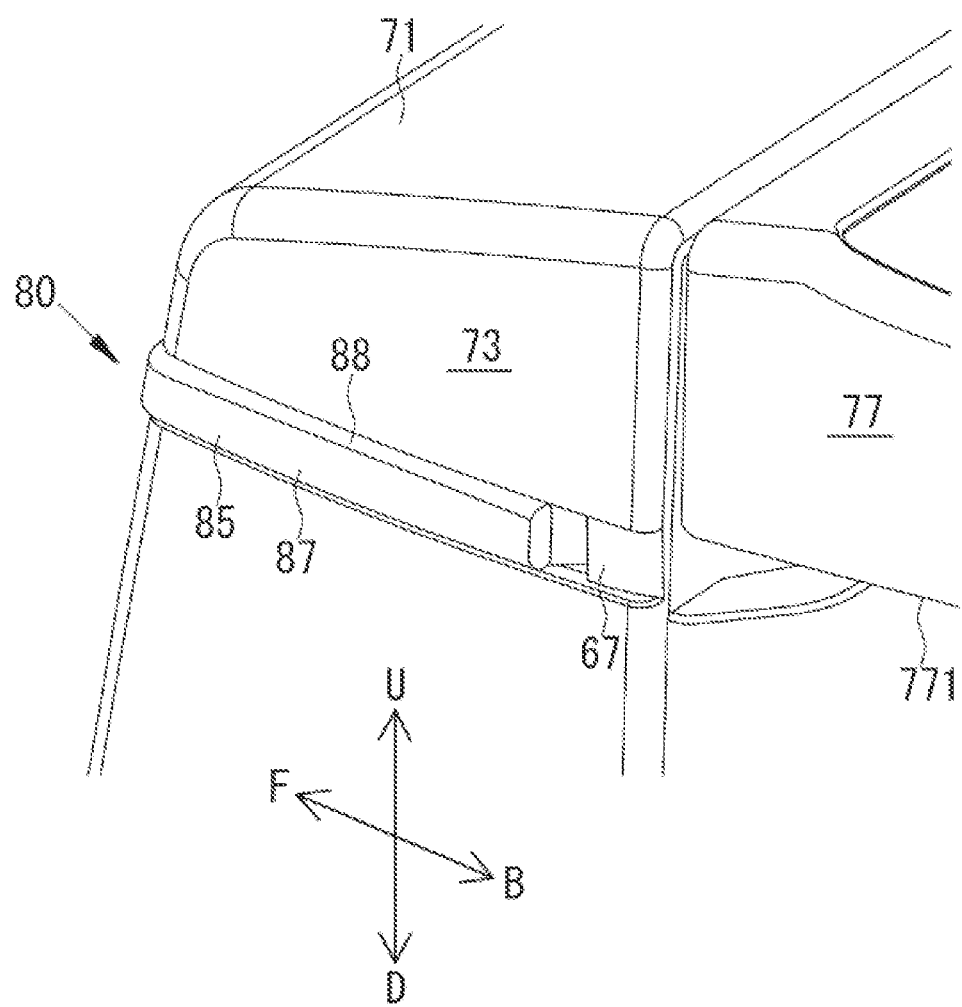
FIG. 5 is a perspective view of the cover and a second displayer, seen from diagonally behind.

FIG. 5 is a perspective view of the cover 71 and the second displayer 87, seen from diagonally behind. As illustrated in FIGS. 4 and 5, a recess 67 is formed in the second side second side surface 73 of the cover 71 near the end of the second displayer 87. The recess 67 is formed in an area adjacent to the second displayer 87 and closer to the document placement section 60 than the second displayer 87. In other words, the recess 67 is formed on a rear side B of the second displayer 87. The recess 67 is formed to emit light from the second displayer 87 to the document placement section 60 side. In this embodiment, as illustrated in FIG. 4, the amount of recess 67 recessed into the outer surface of the cover 71 is D2.

As illustrated in FIG. 5, the recess 67 is formed in the second side surface 73 of the cover 71, thereby increasing the difference in height between the recess 67 and the protrusion 88.

By forming the recess 67 in the cover 71, the light from the displayer 85 is emitted to the document placement section 60 side, and the range in which the light can be seen can be widened, thereby improving the visibility of the notifier 80. In addition, the gradation of light and dark caused by light hitting the recess 67 can improve the visibility of the notifier 80.

Referring back to FIG. 4, the support case 91 is a member for attaching the light guide 81 and the light source 95 to the inner surface side of the cover 71. The support case 91 has a first opening 92, a second opening 93, and a wall 94. The wall 94 blocks the light from the light source 95 in such a manner that the light is not emitted from other than the first opening 92. As a result, it is possible to suppress the light from the light source 95 from leaking into the interior of the cover 71. The first opening 92 is an opening for attaching the light guide 81 and emitting the light from the light source 95 to the outside through the light guide 81. The second opening 93 is an opening for attaching the light source 95. The second opening 93 is provided at a position facing the first opening 92. The second opening 93 to which the light source 95 is attached is provided at a position facing the first opening 92 to which the light guide 81 is attached. As a result, the light source 95 can be easily attached and replaced, and the light from the light source 95 can be prevented from leaking into the interior of the cover 71.

Figure 6:
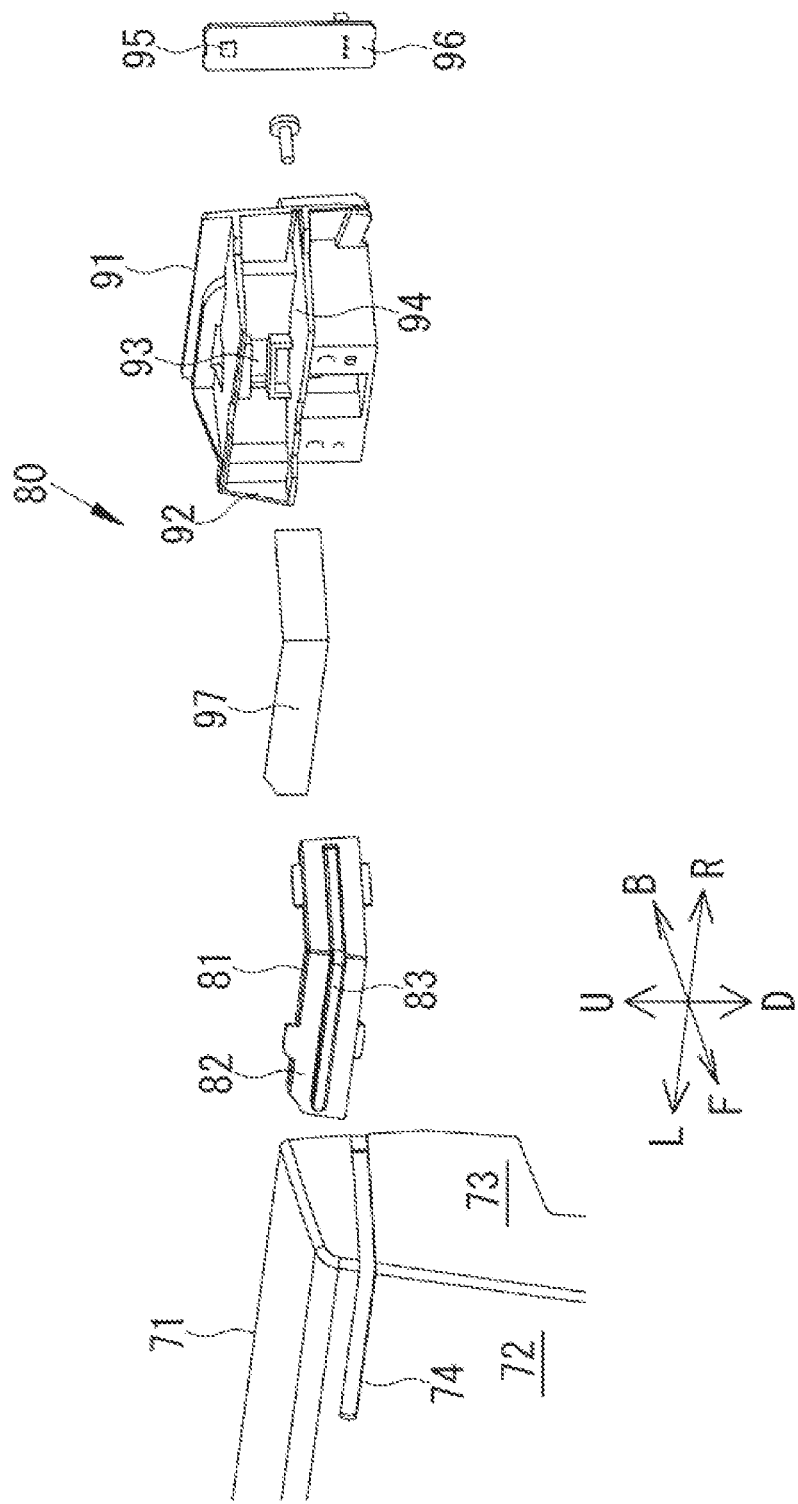
FIG. 6 is an exploded perspective view illustrating a state of assembling a support case, a light guide, and a light source of the notifier.
Figure 7:
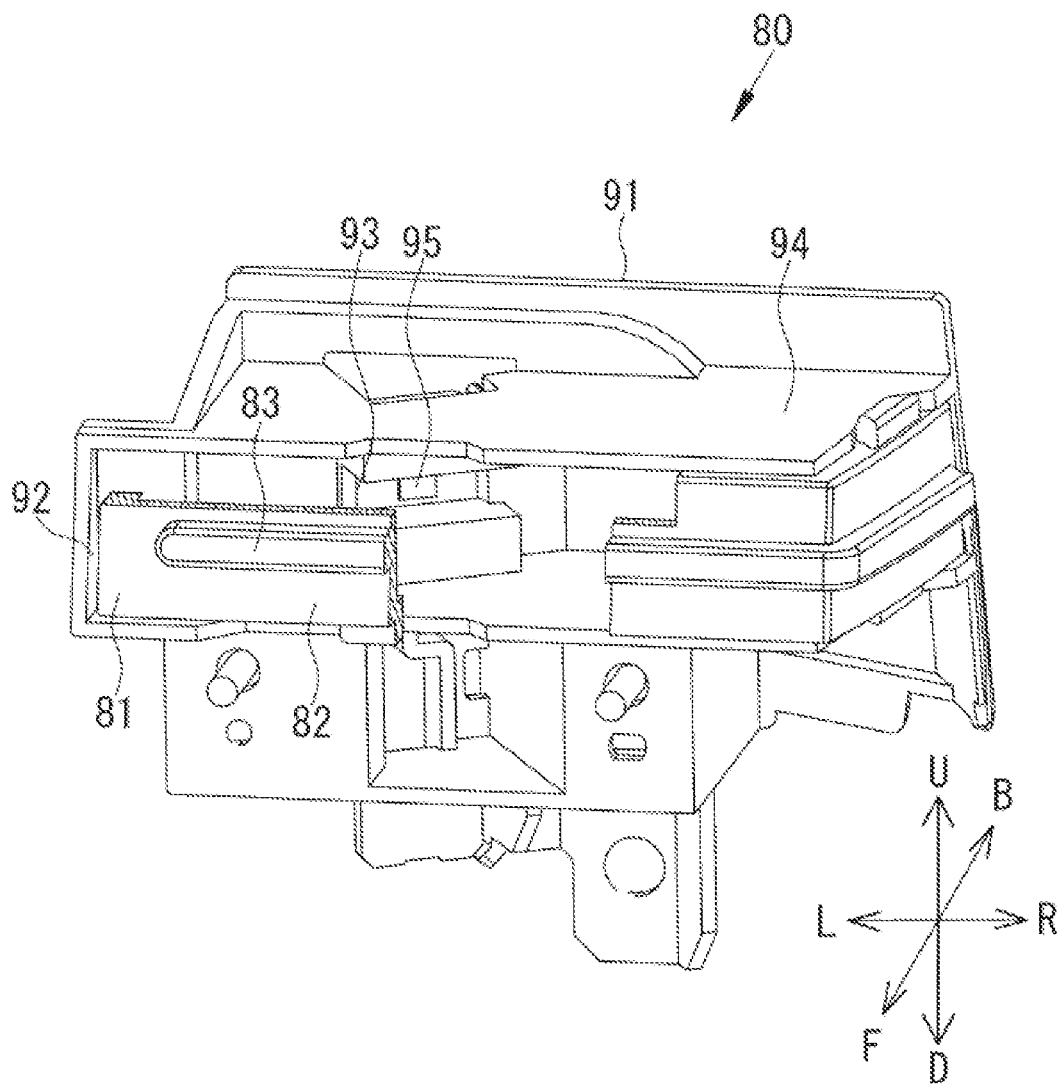
FIG. 7 is a perspective view illustrating a state of assembling the support case, light guide, and light source of the notifier, which are partially cut off.

FIG. 6 is an exploded perspective view illustrating a state of assembling the support case 91, light guide 81, and light source 95 of the notifier 80. FIG. 7 is a perspective view illustrating a state of assembling the support case 91, light guide 81, and light source 95 of the notifier 80, which are partially cut off.

As illustrated in FIGS. 6 and 7, the light guide 81 is attached to the first opening 92 of the support case 91, and the light source 95 is attached to the second opening 93. An LED, which is the light source 95, is provided on a substrate 96. The light source 95 is disposed in the second opening 93 so as to irradiate light into the support case 91, and the substrate 96 is fixed to the support case 91. A translucent diffusion sheet 97 is attached to the back side of the light guide 81. The diffusion sheet 97 is attached to prevent direct visibility of the light source 95 from outside.

The assembled support case 91, light guide 81, and light source 95 are attached from the back (rear) side of the cover 71.

The first side surface 72 and the second side surface 73 of the cover 71 are provided with the slit 74 formed in accordance with the shape of the elongated protrusion 83. The elongated protrusion 83 is fitted into the slit 74 from the back side of the cover 71, and the support case 91 is fixed to the cover 71 with the elongated protrusion 83 exposed from the slit 74.

With the above configuration, the displayer 85 of the notifier 80 can guide the operator's line of sight to the document placement section 60. This can make it easier for the operator to understand that the information notified by the notifier 80 is information on the document placement section 60 and the intent of the notified information.

Other Embodiments

The embodiment disclosed herein is an exemplification in all points, and never provides a basis for limited interpretation. Therefore, the technical scope of the present invention is not interpreted on the basis of only the above-described embodiment but is defined on the basis of the description in claims. Furthermore, the technical scope of the present invention includes all the modifications within the meaning and the scope equivalent to the claims.

For example, in the present embodiment, the first displayer 86 and the second displayer 87 are integrally formed. However, the first displayer 86 and the second displayer 87 are not limited to this. For example, the first displayer and the second displayer may be separate from each other, and the first displayer and the second displayer may be disposed separately on the first side surface 72 and the second side surface 73 of the cover 71. Even in this case, the operator's line of sight can be easily guided to the document placement section 60 that is disposed at the end in the direction in which the first displayer and the second displayer are lined up.

The present invention can be applied to an electrophotographic image forming apparatus and a document feeder provided in the image forming apparatus.

What is claimed is:

1. A document feeder comprising:
    a document placement section where a plurality of documents can be placed;
    a document conveyance path that conveys documents placed on the document placement section;
    a paper feeder that feeds the documents placed on the document placement section to the document conveyance path;
    a cover that covers side surfaces of the document conveyance path and the paper feeder in a direction orthogonal to a document conveyance direction; and
    a notifier that notifies information on the document placement section,
    wherein the cover has a first side surface disposed along the document conveyance direction and a second side surface disposed from an end of the first side surface on the paper feeder side toward the document placement section,
    wherein the notifier includes a displayer that displays the information by light,
    wherein the displayer includes a first displayer disposed on the first side surface and a second displayer disposed on the second side surface toward the document placement section, and
    wherein the first displayer and the second displayer each have a horizontal length that is longer than a vertical length.

2. The document feeder according to claim 1,
    wherein the first side surface and the second side surface are formed to be contiguous, and
    wherein the first displayer and the second displayer are integrally formed.

3. The document feeder according to claim 1, wherein the first displayer and the second displayer are individually disposed on the first side surface and the second side surface, respectively.

4. The document feeder according to claim 1, wherein the second side surface has a recess that emits light from the second displayer to the document placement section side in an area adjacent to the second displayer and closer to the document placement section than the second displayer.

5. The document feeder according to claim 1, further comprising a top surface cover that covers a top surface side of the paper feeder and the document conveyance path,
    wherein the top surface cover has a top surface cover end that constitutes an upper end of a document passing portion through which a document fed by the paper feeder passes, and
    wherein the displayer is substantially disposed on an extension line of the top surface cover end.

6. The document feeder according to claim 1,
    wherein the notifier includes a light source that emits light to the displayer, and
    wherein the displayer has translucency that allows the light from the light source to pass through, and has a protrusion that protrudes outward from an outer surface of the cover.

7. The document feeder according to claim 6, wherein the displayer has a minute unevenness that diffusely reflects the light from the light source.

8. The document feeder according to claim 6,
    wherein the notifier includes a support case for attaching the light source and the displayer to the cover, and
    wherein the support case has a first opening to which the displayer is attached, and a wall that blocks light from the light source in such a manner that the light is not emitted from other than the first opening.

9. The document feeder according to claim 8,
    wherein the support case has a second opening to which the light source is attached, and
    wherein the second opening is provided at a position facing the first opening.

10. An image forming apparatus comprising the document feeder according to claim 1.

* * * * *